(12) United States Patent
Motoshima et al.

(10) Patent No.: US 9,046,150 B2
(45) Date of Patent: Jun. 2, 2015

(54) SILENT CHAIN

(71) Applicant: Tsubakimoto Chain Co., Osaka (JP)

(72) Inventors: Yoshiki Motoshima, Osaka (JP); Masatoshi Sonoda, Osaka (JP); Naoki Okada, Osaka (JP); Yoshinori Tsujino, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 224 days.

(21) Appl. No.: 13/852,251

(22) Filed: Mar. 28, 2013

(65) Prior Publication Data

US 2013/0267364 A1 Oct. 10, 2013

(30) Foreign Application Priority Data

Apr. 4, 2012 (JP) ................................ 2012-085615

(51) Int. Cl.
*F16G 13/04* (2006.01)

(52) U.S. Cl.
CPC ...................................... *F16G 13/04* (2013.01)

(58) Field of Classification Search
None
See application file for complete search history.

(56) References Cited

U.S. PATENT DOCUMENTS

| 5,154,674 A * | 10/1992 | Avramidis et al. ............ 474/214 |
| 6,334,829 B1 * | 1/2002 | Saito et al. .................... 474/213 |
| 2011/0183800 A1 * | 7/2011 | Tohara .......................... 474/206 |
| 2011/0224041 A1 | 9/2011 | Tokita et al. |

FOREIGN PATENT DOCUMENTS

JP 08035541 2/1996

\* cited by examiner

*Primary Examiner* — William E Dondero
*Assistant Examiner* — Mark K Buse
(74) *Attorney, Agent, or Firm* — Howson & Howson LLP

(57) ABSTRACT

A silent chain includes guide plates each of which has a cut-away portion on its inner side and a cut-away portion on its outer side for allowing elastic deformation of the guide plate in the longitudinal direction of the chain so that bowing of the connecting pins of the chain is reduced, and galling of the connecting pins and unbalance of the loads on the link plates of the chain are suppressed. The deepest parts of the respective cut-away portions are longitudinally offset from each other so that longitudinal elastic deformation can occur without impairing the tensile strength of the guide plate.

2 Claims, 11 Drawing Sheets

SILENT CHAIN

CROSS-REFERENCE TO RELATED APPLICATION

The disclosure of Japanese patent application 2012-085615, filed on Apr. 4, 2012 is incorporated herein by reference.

FIELD OF THE INVENTION

The invention relates to a silent chain of the kind used in the timing system of an internal combustion engine, and particularly to a silent chain which allows guide plates to deform elastically in a longitudinal direction.

BACKGROUND OF THE INVENTION

In a conventional silent chain, link plates having pairs of pin holes are arranged alternately in guide rows and non-guide rows with the link plates of each row interleaved with link plates of a preceding row and a following row to provide a chain in the form of an endless loop. The rows of link plates are connected by pins that extend through the pin holes in the link plates. Guide plates are arranged at both ends of each guide row and the pins are press-fit into pin holes of the guide plates but fit loosely in the pin holes of the other plates of the chain to allow articulation of the guide rows relative to the non-guide rows. Each of the guide plates has an inner side facing toward the inside of the loop formed by the chain, and an outer side facing toward the outside of the loop. The outer side of each guide plate is typically substantially flat in a direction parallel to a pitch line which connects the centers of the pin holes of the guide plate. Such a chain is described in United States Patent Publication 2011/0224041, published on Sep. 15, 2011.

Another known silent chain, depicted in Japanese laid-open Patent Application No. H8-35541, includes guide links each having a base portion, a pair of openings spaced from each other, a pair of toe portions spaced from each other and extending upwardly, and a crotch portion connecting inner flank surfaces of the pair of toe portions.

FIGS. 12 and 13 show a guide plate 520 in a silent chain 500 of the kind described in United States Patent Publication 2011/0224041. This guide plate is placed under tension in the longitudinal direction of the guide plate. Elastic deformation of plate 520 in the longitudinal direction of the chain is more restricted than the lateral elastic deformation of the toothed link plates 510 of the chain because the guide plate 520 has a smaller cut-away portion than the cut-away portion of a link plate 510. Consequently, as shown in FIG. 13, the connecting pins 530 extending through a plurality of link plates 510 in a guide row and a pair of the guide plates 520 at the ends of the guide row become bent or bowed, and become out of parallel with pin holes 511 of the link plates 510. This departure from a parallel relationship between the pins 511 and the pin holes of the link plates results in uneven wear, referred to as "galling" on the surfaces of the connecting pins 510 where they are contacted by the link plates 510.

Because the connecting pins 530 become out of parallel with the pin holes 511 due to bending, the tensile load acting on the link plates 510 becomes unbalanced, and is concentrated on the outermost link plates 510. Consequently, the outermost link plates more easily undergo abrasive wear and or more subject to the formation of cracks, and the fatigue strength of the chain as a whole decreases.

As shown in FIG. 14, when the link plates 510 of a guide row GL engage a sprocket S, a space created between teeth 510t of the link plates of the guide row and a sprocket tooth St of the sprocket S becomes sealed by an adjacent pair of guide plates 520. Air confined in this space is compressed and generates an unpleasant explosive sound when released.

On the other hand, in a silent chain having a guide link of the kind described in Japanese laid-open Patent Application No. H8-3554, and shown in FIGS. 15 and 16, when a guide link 610 is placed under longitudinal direction, the toe portions 613, which extend toward the outside of the loop formed by the chain are pulled in opposite directions. The tensile force tends to form a crack at a crotch portion 614 of the guide plate. At the same time, side of the guide link 610 facing toward the inside of the loop is compressed in the longitudinal direction, and the guide link 610 warps, causing the pin holes to become out of parallel with connecting pins. Here again, uneven wear causes galling of the surfaces of the connecting pins where they contact the pin holes.

This invention addresses the above-described problems, and it is an object of the invention to achieve one or more of the following results: suppression of bending or bowing of connecting pins; reduction of wear elongation of the chain; increase in the fatigue strength of the chain; extension of the useful life of the chain; and reduction of noise due to the confinement of air between link teeth and sprocket teeth.

SUMMARY OF THE INVENTION

The silent chain according to the invention comprises a plurality of link plates having pairs of pin holes. The link plates being arranged in alternating guide rows and non-guide rows along a longitudinal direction, with the link plates of each row interleaved with link plates of a preceding row and a following row to provide a chain in the form of an endless loop. The link plates include guide plates arranged at opposite ends of each guide row, and connecting pins extending through the pin holes in the link plates. The connecting pins are press-fit into pin holes of the guide plates and fit loosely in the pin holes of the other plates of the chain to allow articulation of the guide rows relative to the non-guide rows as the chain as the chain engages and disengages a sprocket.

Each of the guide plates has an inner side facing toward the inside of the loop formed by the chain, and an outer side facing toward the outside of the loop. Each of the guide plates has a cut-away portion formed on its inner side and a cut-away portion formed on its outer side. These cut-away portions allow elastic deformation of the guide plates in the longitudinal direction.

Each of the cut-away portions in each guide plate has a deepest part, which is the part closest to an imaginary pitch line connecting the centers of the pair of pin holes in the guide plate. The deepest parts of the cut-away portions of each guide plate are disposed on opposite sides of the pitch line and longitudinally offset from each other so that one of the deepest parts precedes the other in the longitudinal direction.

One advantage of the invention is that the cut-away portions reduce the weight of the guide plate. The cut-out portions also allow the guide plate to elongate elastically in the longitudinal direction of the chain, and the guide plate thus follows the movements of the link plates constituting the guide rows and the non-guide rows pins. Consequently, it becomes possible to suppress bending or bowing of the connecting pins and to avoid galling on the surfaces of the connecting pins, and also to prevent the tensile loads acting on the link plates and guide plates from becoming unbalanced. Thus it is possible to reduce elongation of the chain due to wear, to increase the fatigue strength of the chain, and extend the useful life of the chain.

The longitudinally offset relationship of the cut-away portions of the guide plate also prevents the cross-sectional area of the guide plate from decreasing sharply even when the cut-away portions are large. Thus, it is possible to facilitate elastic elongation of the guide plate by increasing the size of the cut-away portions on the inner and outer sides and thereby avoid uneven wear on the surfaces of the connecting pins contacted by the link plates. The increased elastic elongation of the guide plate occurs both at the inside cut-away portion and the outside cut-away portion of the guide plate. Consequently it is possible to achieve improved suppression of bending or bowing of the connecting pins in the longitudinal direction of the chain. Uneven wear, i.e., galling, of the connecting pins is avoided and the tensile load on the link plates of the chain is prevented from becoming unbalanced.

Furthermore, because cut-away portions are formed on the inner sides of the guide plates, when the link plates of a guide row engage a sprocket, the air confined between the teeth of the link plates and the sprocket teeth freely escapes in a lateral direction through the cut-away portions on the inner sides of the guide plates. Thus, it is possible to reduce noise to a level below the level of the noise generated by confinement and compression of air between the link plate teeth and sprocket teeth in a conventional silent chain.

According to a second aspect of the invention, the deepest parts of the cut-away portions of each guide plate are disposed on opposite sides of a portion of the pitch line of the same guide plate between centers of the pin holes thereof. Each of the deepest parts of the cut-away portions of each guide plate can be disposed on an imaginary line perpendicular to the pitch line and between the centers of the pin holes thereof. The deepest part of each of the cut-away portions of each guide plate can be disposed on an imaginary line perpendicular to the pitch line and intersecting the pitch line between the pin holes. This positioning of the cut-away portions allows the guide plates to have external dimensions that enable them to engage the sides of sprocket teeth while the teeth of the guide rows and the non-guide rows sequentially engage sprocket teeth and thereby prevent the guide rows and the non-guide rows from sliding laterally.

According to a third aspect of the invention, the inner side of a guide plate has outer flanks, and the shortest distance A from the cut-away portion on the outer side of each guide plate to the nearest of the pin holes thereof, the shortest distance B from a pin hole thereof to the part of the back surface farthest from the pitch line, the shortest distance C from an outer flank on the inner side to the nearest of the pin holes thereof, and the shortest distance D from one of the cut-away portions to the other satisfy the relationships $A \geq B$, $A \geq C$, $D \geq B$, and $D \geq C$.

With the above relationships, the cut-away portion can allow increased elastic deformation of the guide plate in the longitudinal direction when the chain is under tensile stress while maintaining the tensile strength of the plate at a level substantially the same as that of a conventional guide plate.

According to a fourth aspect of the invention, the inner side of a guide plate has outer flanks, and wherein the shortest distance B from a pin hole thereof to the part of the back surface farthest from the pitch line, the shortest distance C from an outer flank on the inner side to the nearest of the pin holes thereof, and the shortest distance D from one of the cut-away portions to the other satisfy the relationships, and the shortest distance E from the cut-away portion on the inner side to the nearest one of the pin holes either of the pair of pin holes satisfy the relationships $D \geq B$, $D \geq C$, $E \geq B$, and $E \geq C$.

With the above relationships, t is possible for the cut-away portion on the inner sides of the guide plates to allow elastic elongation of the guide plates in the longitudinal direction when the chain is under tensile stress while maintaining a tensile strength in the guide plates which is substantially the same as that of the inner side of a conventional guide plate.

According to a fifth aspect of the invention, the shapes of the cut-away portions on the inner and outer sides of each guide plate of at least one guide row of the chain are respectively projections, in a direction perpendicular to the longitudinal direction, of the cut-away portions on the inner and outer sides of the opposite guide plate of the guide row. With this guide plate configuration, irregular twisting of the chain is suppressed. Thus, it is possible for the link plates of the chain to engage the sprocket securely and stably.

DETAILED DESCRIPTION OF THE PREFERRED EMBODIMENTS

Figure 1:
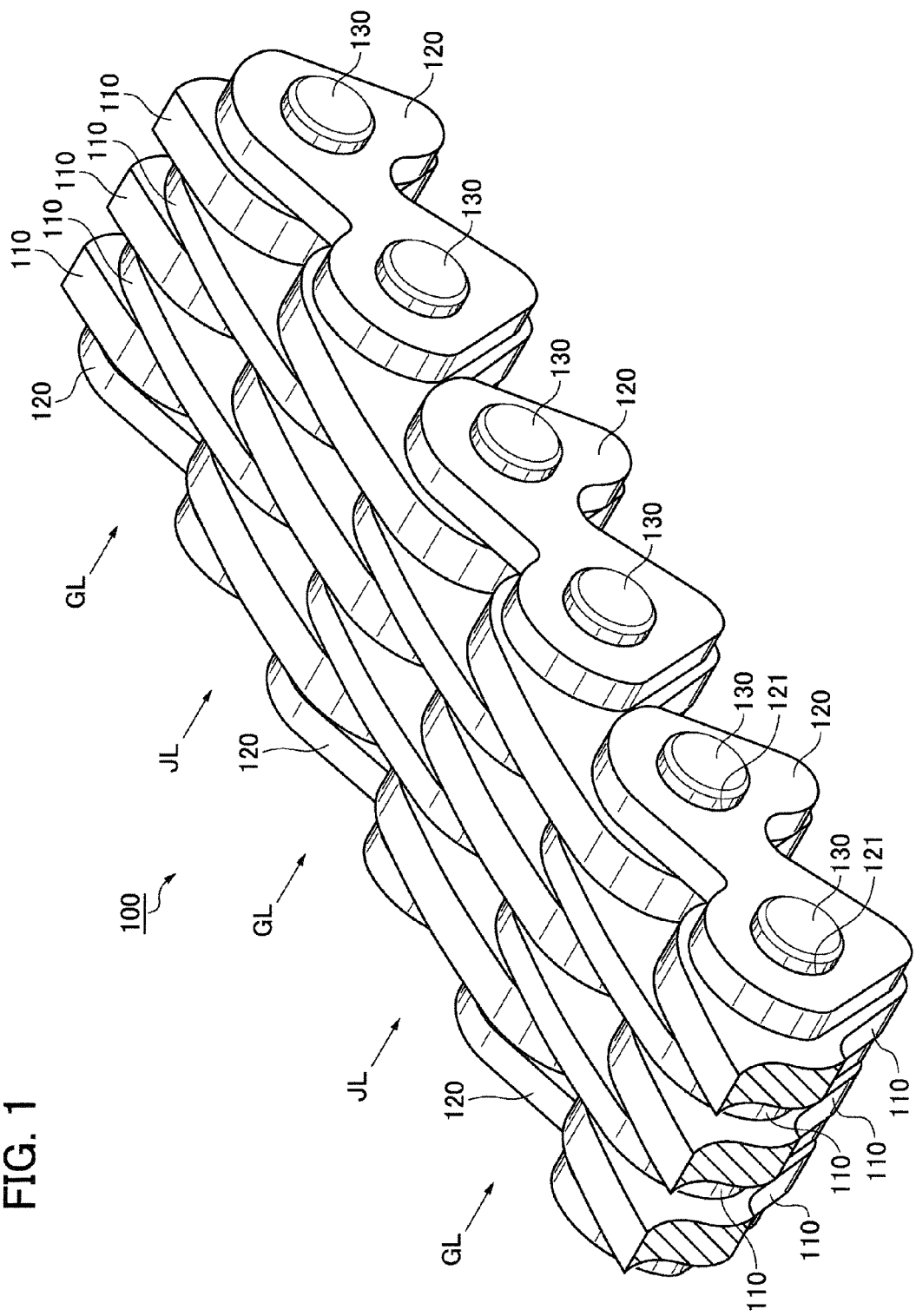
FIG. 1 is a perspective view of a part of a silent chain according to a first embodiment of the invention.
Figure 2:
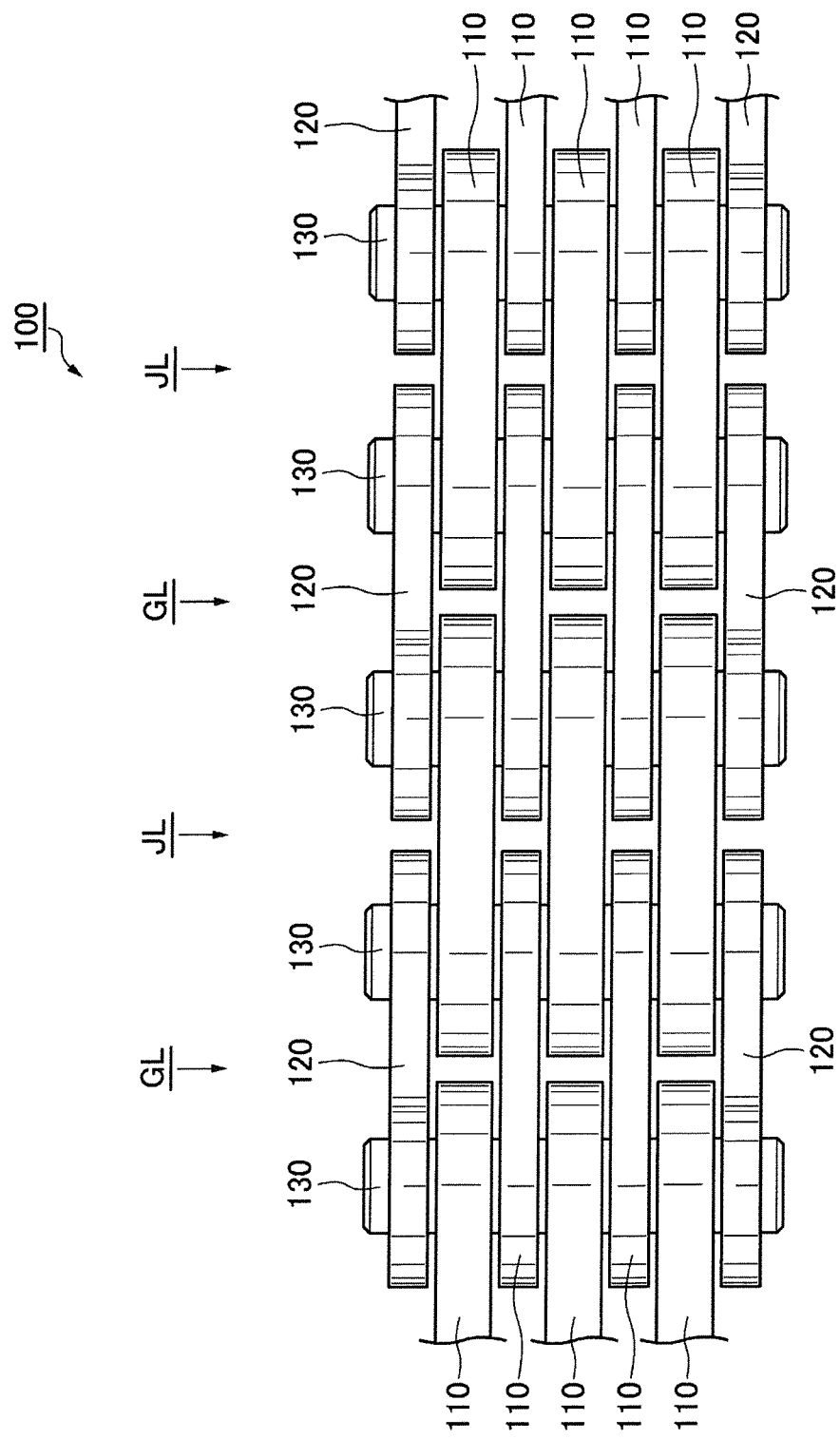
FIG. 2 is a plan view of the silent chain of FIG. 1.

As shown in FIGS. 1 and 2, a silent chain 100 according to a first embodiment of the invention includes link plates 110 arranged in guide rows GL and non-guide rows JL. The guide rows and non-guide rows are arranged in alternating relationship along the longitudinal direction of the chain so that the chain is in the form of an endless loop. A pair of guide plates 120, each having a pair of pin holes 121 is provided on each guide row GL, one guide plate being at each end of the guide row so that link plates of the guide row are disposed between the two guide plates. Each of the link plates 110 has two pin holes through which connecting pins 130 fit loosely to connect the plates of the guide rows and non-guide rows in interleaved relationship. The connecting pins are press-fit into the pin holes 121 of the guide plates 120.

In a transmission, for example an engine timing drive, the silent chain 100 is engaged with driving and driven sprockets (not shown) so that a side of the link plates 110 that faces toward the inside of the loop can engage teeth of the sprockets, and so that parts of the guide plates 120 can contact side faces of the sprockets to limit lateral movement of the chain relative to the sprockets.

Figure 3:
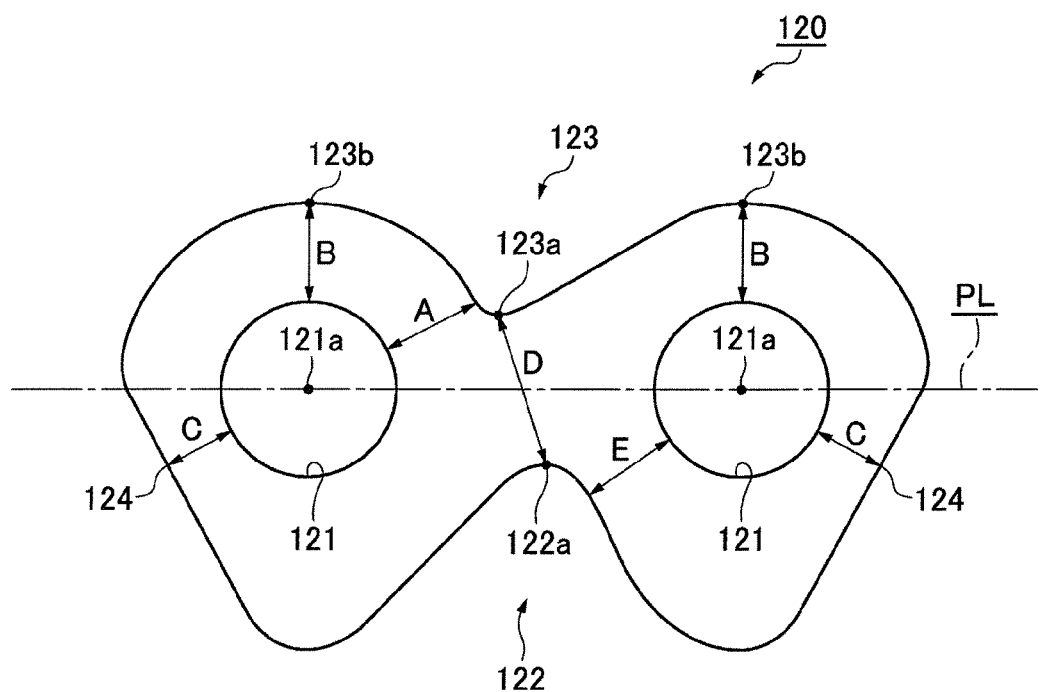
FIG. 3 is a side elevational view of a guide plate of the silent chain shown in FIG. 1.
Figure 4:
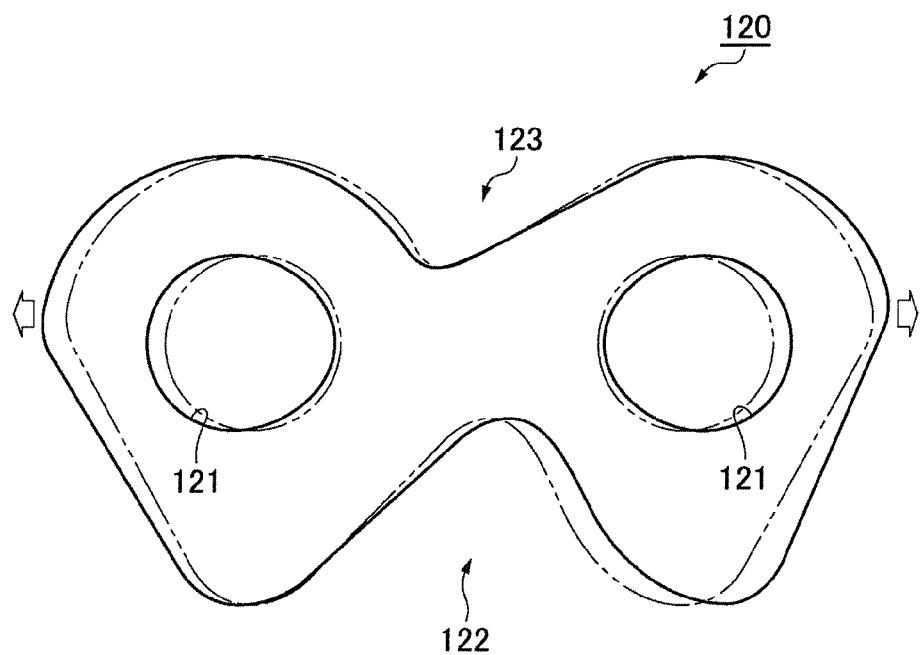
FIG. 4 is a side elevational view illustrating deformation of the guide plate of FIG. 3.

As shown in FIG. 3, the guide plate 120 has a cut-away portion 122 on its inner side, i.e., the side facing toward the inside of the loop formed by the chain, and cut-away portion 123 on its outer side, i.e., the side facing toward the outside of the loop, which can also be referred to as the "back" side. These cut-away portions allow elastic deformation of the guide plate 120 in the longitudinal direction, as shown in FIG. 4.

The cut-away portion 122 on the inner side and the cut-away portion 123 on the outer side are created by cutting away parts of the guide plate 120, from the plate inner side and the outer side respectively, toward a pitch line PL that connecting the centers 121a of the two pin holes 121 so that the deepest parts of the cut-away portions 122 on the inner side and 123 on the outer side are both positioned at locations directly opposite points on the pitch line PL between the pin holes 121. The shape of the cut-away portion on the inner side 122 and the shape of the cut-away portion on the outer side 123 are each composed of a plurality of curved lines and one straight line.

Figure 5:
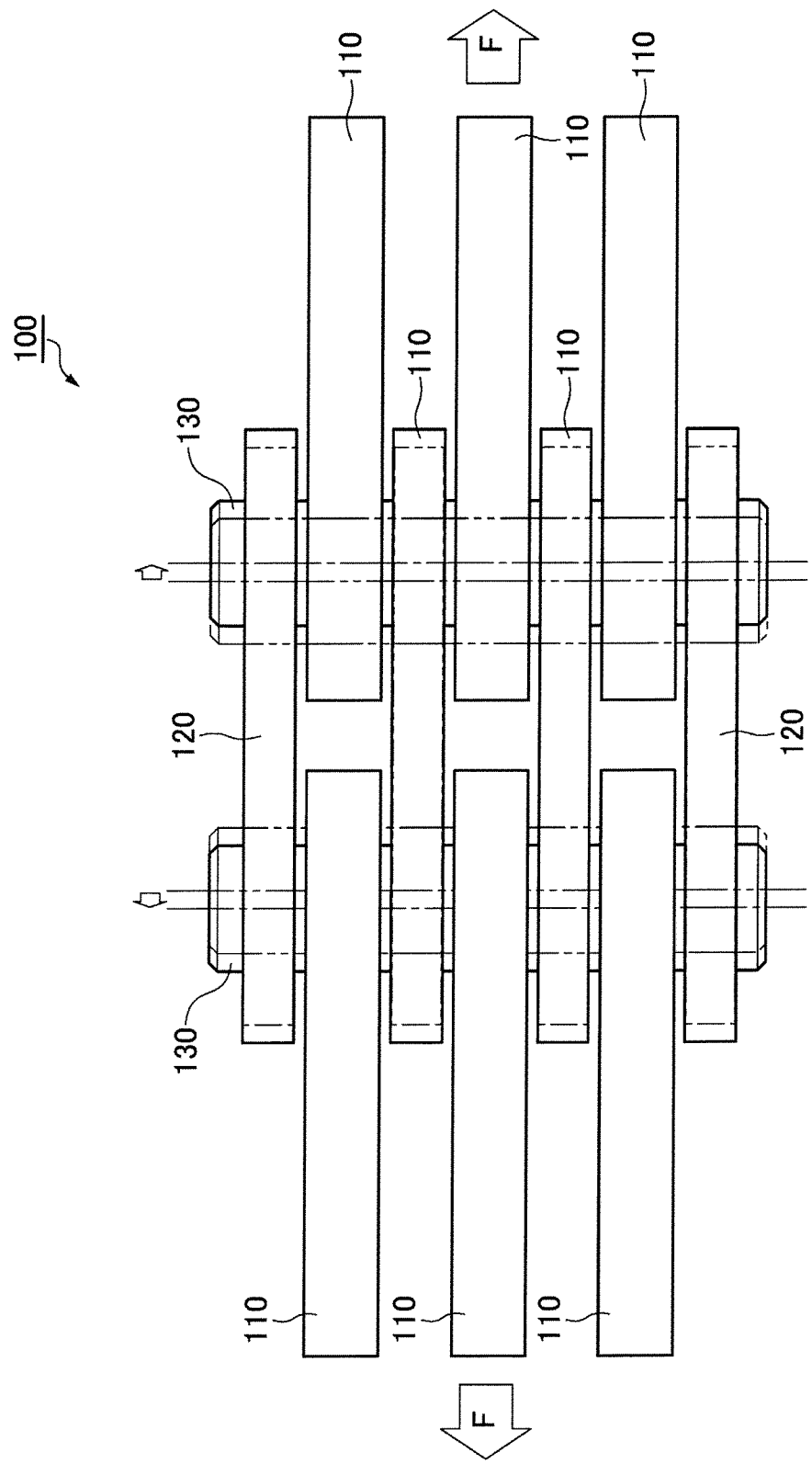
FIG. 5 is a plan view of a portion of the silent chain of FIG. 1, showing the chain under tension.

Because the link plate has cut-away portions 122 and 123, the weight of the guide plate 120 is reduced by an amount corresponding to the size of the amount of the cut-away portions. As shown in FIG. 5, when a tension force F is applied to the chain, generated, the cut-away portions allow the guide plates 120 to elongate elastically in the longitudinal direction so that they follow the movement of the connecting pins caused by relative movement of guide rows GL and the non-guide rows JL.

As shown in FIG. 3, the cut-away portion of the guide plate on the inner side 122 and the cut-away portion on the outer side 123 are longitudinally offset from each other so that one cut-away portion precedes the other in the direction of chain travel. The longitudinally offset relationship of the cut-away portions allows the cut-away portions to be large in size while avoid a sharp decrease in the cross-section of the guide plate. Elastic elongation of the guide plate 120 when the chain is under tension the chain tension occurs both on the inner side and on the outer side of the guide plate, i.e., in the cut-away portion 122 on the inner side and the cut-away portion 123 on the outer side.

Figure 6:
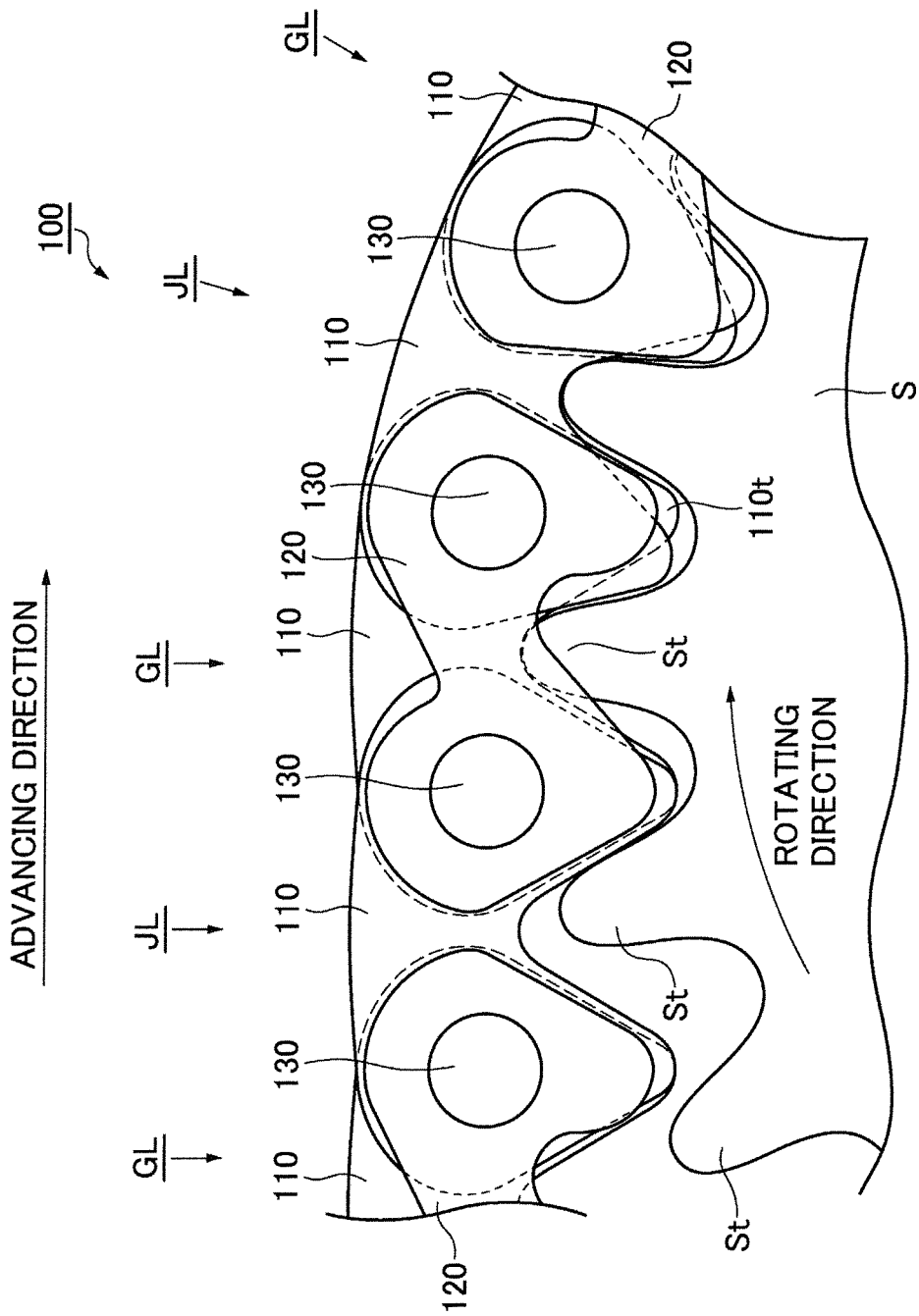
FIG. 6 is a side elevational view showing a portion of the chain in engagement with a sprocket.

As illustrated in FIG. 6, the cut-away portions 122 on the inside of the guide plates also allow air that would otherwise be confined between the link teeth 110t of the link plates and the sprocket teeth St to escape freely through the cut-away portions 122 in a lateral direction, i.e., in a direction perpendicular to the plane of FIG. 6.

As shown in FIG. 3, the cut-away portion 123 on the inner side and the cut-away portion 123 on the outer side of the guide plate 120 are positioned entirely between imaginary planes perpendicular to the pitch line PL and in which the center lines 121a of pin holes 121 lie. Thus, cut-away portions are formed where a conventional guide plate would have its maximum external dimensions.

In FIG. 3, reference letter A indicates the minimum distance from the cut-away portion 123 on the outer side to a pin hole 121. Reference letter B indicates the minimum distance from the back surface on the outer side of the plate to a pin holes 121, i.e., the distance from a starting point 123b of the cut-away portion 123 on the outer side to a pin hole 121. Reference letter C indicates the minimum distance from an outer flank 124 on the inner side of the plate to a pin hole 121. Reference letter D indicates the minimum distance from the cut-away portion 123 on the outer side to the cut-away portion 122 on the inner side. This distance D corresponds to the distance from the deepest point 123a of the cut-away portion on the outer side 123 to the deepest point 122a of the cut-away portion 122 on the inner side. Reference letter E indicates the minimum distance from the cut-away portion 122 on the inner side to a pin hole 121.

The shape of the cut-away portion on the outer side 123 satisfies the relationships $A \geq B$, $A \geq C$, $D \geq B$, and $D \geq C$. With this configuration, the tensile strength of the part of the plate between the outside cut-away portion 123 and the closest pin hole 121 and the tensile strength of the part of the plate between the outer side cut-away portion 123 and the inner side cut-away portion 122 are both equal to or greater than the tensile strength of the part of the plate between the starting point 123b of the outer side cut-away portion 123 and the closest pin hole 121, and the tensile strength of the part of the plate between the outer flank portion 124 of the inner side of the plate and the closest pin hole 121. Thus, the cut-away portion 123 on the outer side 123 of the guide plate 120 allows elastic elongation of the guide plate when the chain is subjected to tensile stress while maintaining a tensile strength substantially the same as that of the outer side of a conventional guide plate.

The shape of the cut-away portion on the inner side 122 satisfies the relationship $D \geq B$, $D \geq C$, $E \geq B$, and $E \geq C$.

With this configuration, the tensile strength of the part of the plate between the outer side cut-away portion 123 and the inner side cut-away portion 122, and the tensile strength of the part of the plate between the cut-away portion 122 on the inner side 122 and the closest pin hole 121 are equal to or greater than both the tensile strength of the part of the plate between the starting point 123b of the cut-away portion 123 on the outer side and the closest pin hole 121 and the tensile strength of the part of the plate between the outer flank portion 124 on the inner side and the nearest pin hole 121. Thus, the cut-away portion 122 on the inner side of the guide plate allows elastic elongation of the guide plate when the chain is subjected to tensile stress while maintaining a tensile strength substantially the same as that of the inner side of a conventional guide plate.

Figure 7:
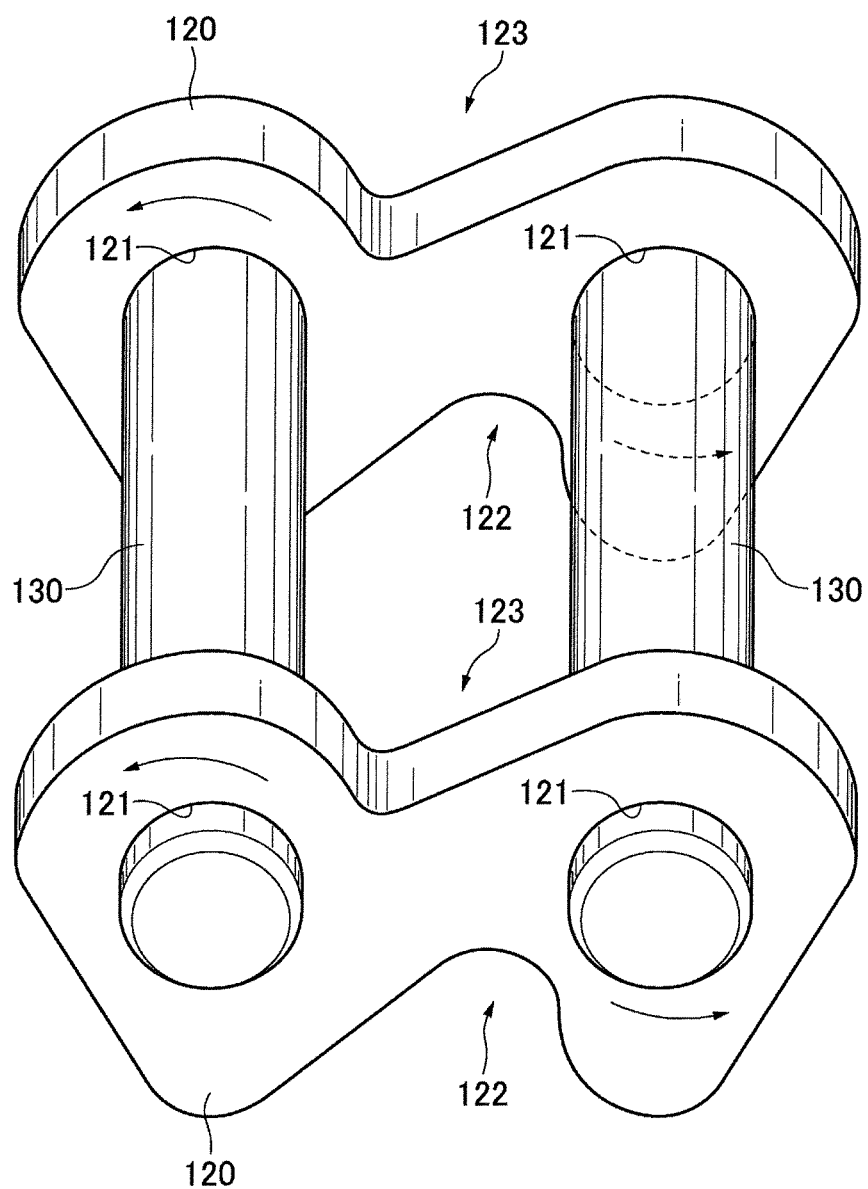
FIG. 7 is perspective view illustrating elastic deformation of the guide plates into which connecting pins are press-fit.

As shown in FIG. 7, the shapes of the cut-away portions on the inner and outer sides of each guide plate of a guide row are respectively projections, in a direction perpendicular to the longitudinal direction of the chain, of the cut-away portions on the inner and outer sides of the opposite guide plate 120 in the same guide row. This symmetrical relationship between the two opposed guide plates of a guide row allows the plates to deform elastically in a balanced manner when the chain is under tensile stress, suppressing irregular twisting of the chain and ensuring stable guidance of the link plates 110 into engagement with a sprocket.

The longitudinally offset relationship of the cut-away portions of each guide plate facilitates elastic elongation of the guide plate by allowing the size of the cut-away portions to be increased. Thus, the guide plate configuration shown in FIGS. 1-7 suppresses bending or bowing of the connecting pins in the longitudinal direction of the chain, thereby avoiding galling of the surfaces of the connecting pins 130, and preventing the tensile load acting on the link plates 110 and guide plates 120 from becoming unbalanced. As a result, wear elongation of the chain is reduced, its fatigue strength is increased, and its useful life is extended.

The cut-away portion 122 on the inner side of the guide plate reduces noise caused by the sudden expansion of air confined between the teeth of the link plates and sprocket teeth. Thus the noise emitted by the chain according to the invention can be significantly reduced in comparison to the noise emitted by a silent chain having conventional guide plates which do not have a inner side cut-away portions.

Figure 8:
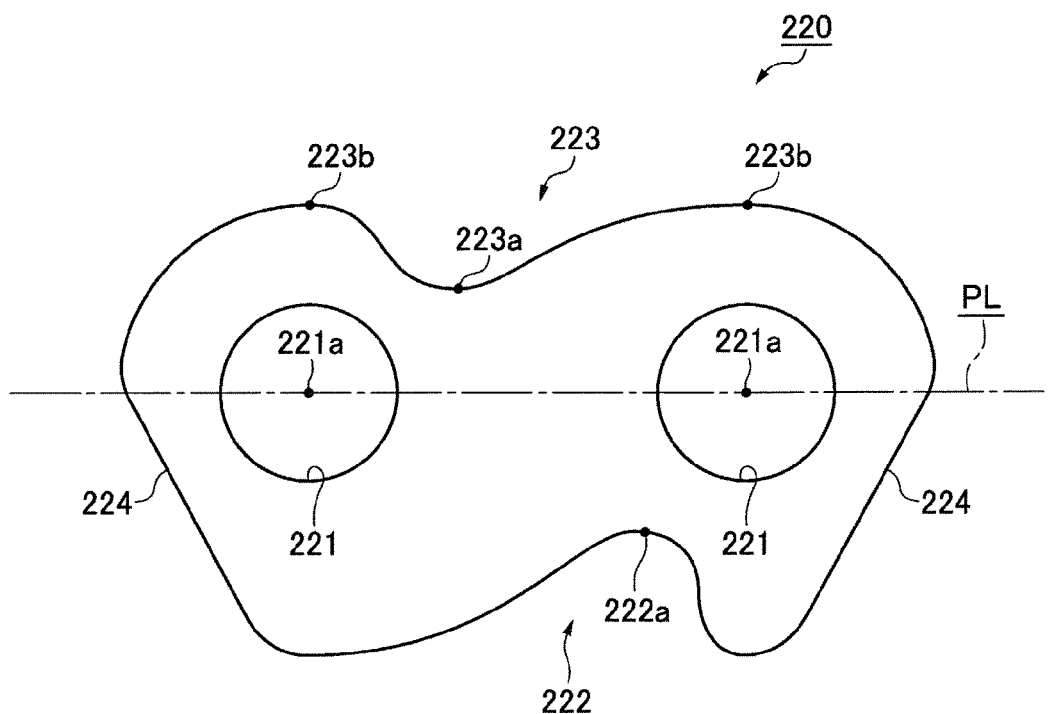
FIG. 8 is a side elevational view of a guide plate of the silent chain of a second embodiment of the invention.
Figure 9:
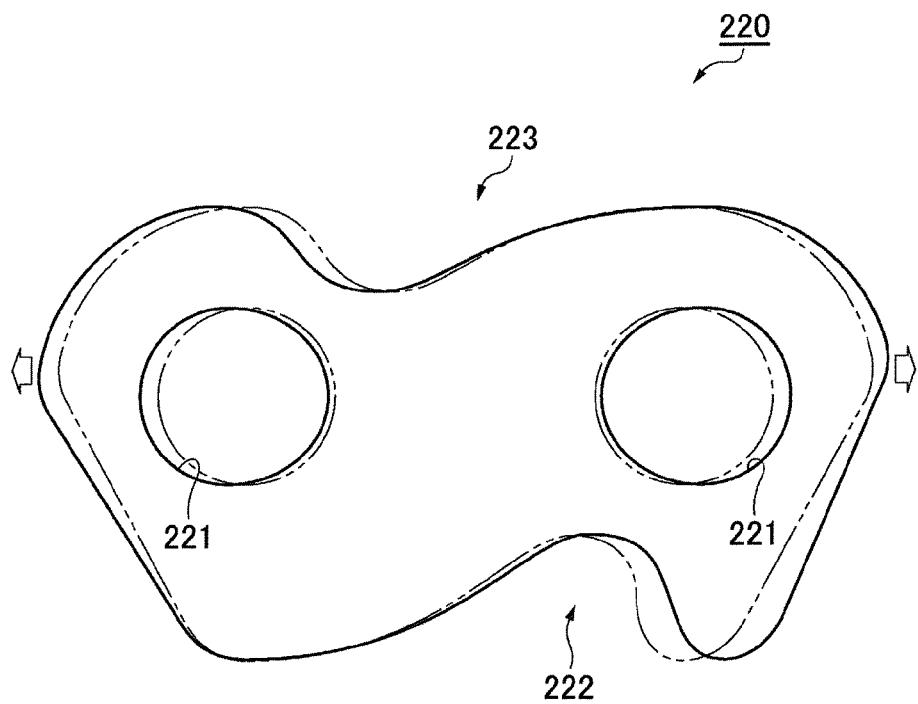
FIG. 9 is a side elevational view illustrating deformation of the guide plate of FIG. 8.

In a second embodiment, shown in FIGS. 8 and 9, a guide plate 220 has a cut-away portion 222 on its inner side and a cut-away portion 223 on its outer side. The shape of each of these cut-away portions consists entirely of a plurality of curved lines. The curved shapes of the cut-away portions of the guide plate in FIGS. 8 and 9 provides improved suppression of the generation of cracks at the cut-away portions.

Figure 10:
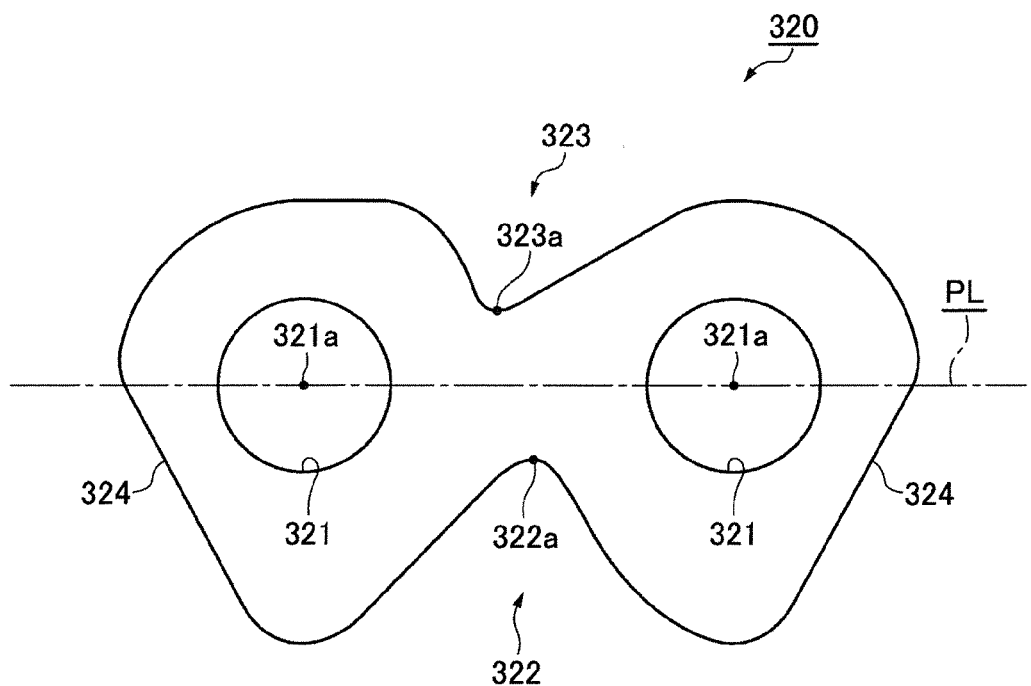
FIG. 10 is a side elevational view of a guide plate of the silent chain of a third embodiment of the invention.
Figure 11:
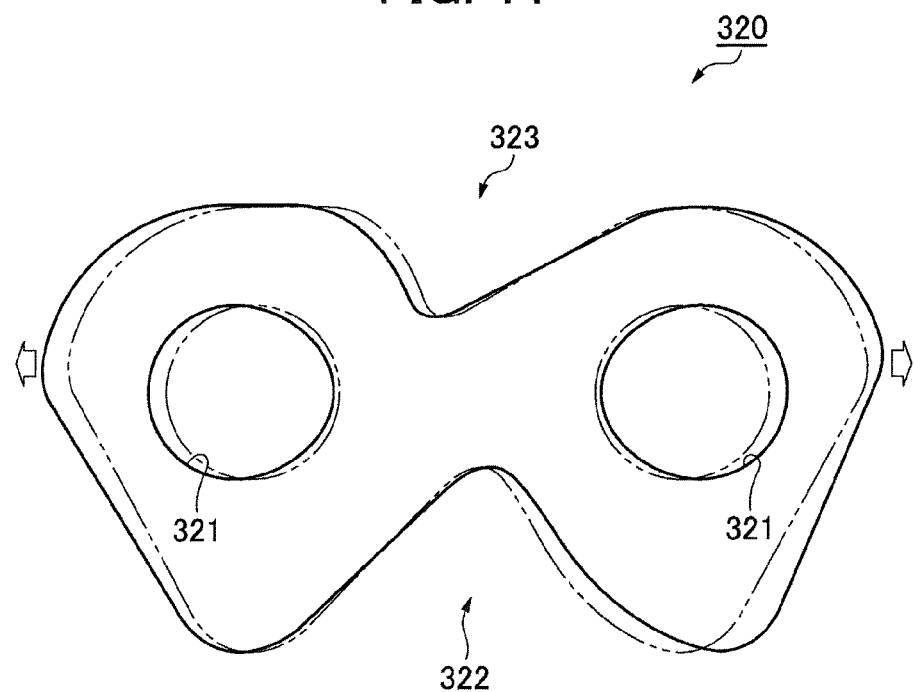
FIG. 11 is a side elevational view illustrating deformation of the guide plate of FIG. 10.
Figure 12:
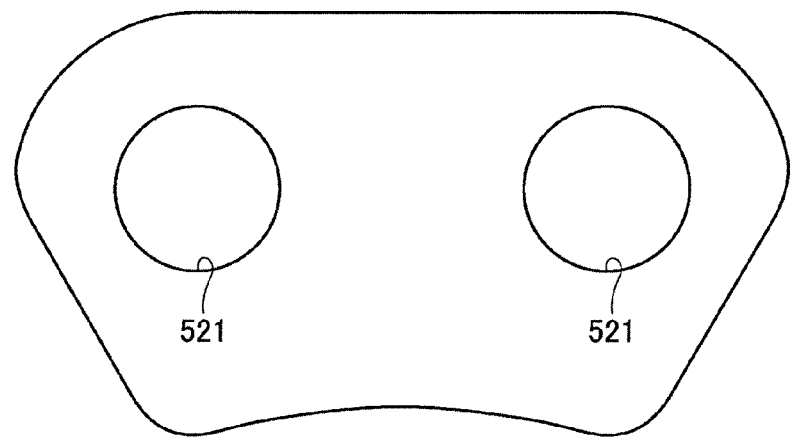
FIG. 12 is a side elevational view of a first conventional guide plate.
Figure 13:
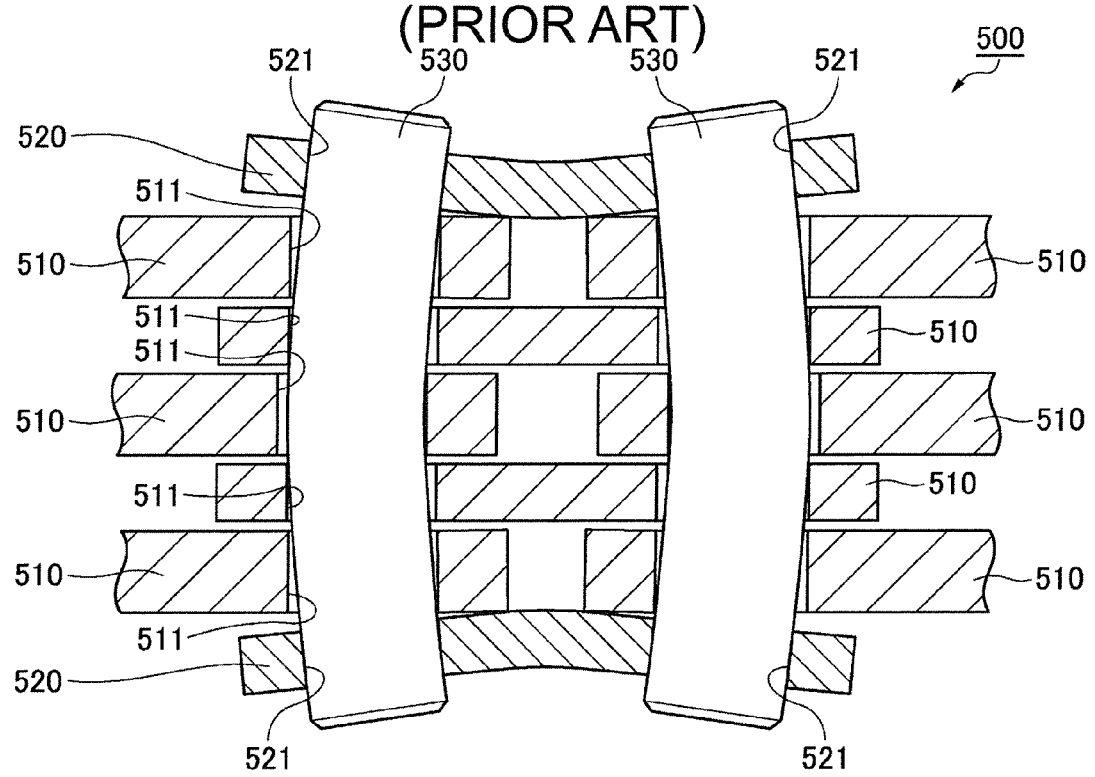
FIG. 13 sectional view of a portion of a conventional silent chain, taken on a section plane in which the axes of the connecting pins lie, illustrating the deformation of the guide plate shown in FIG. 12.
Figure 14:
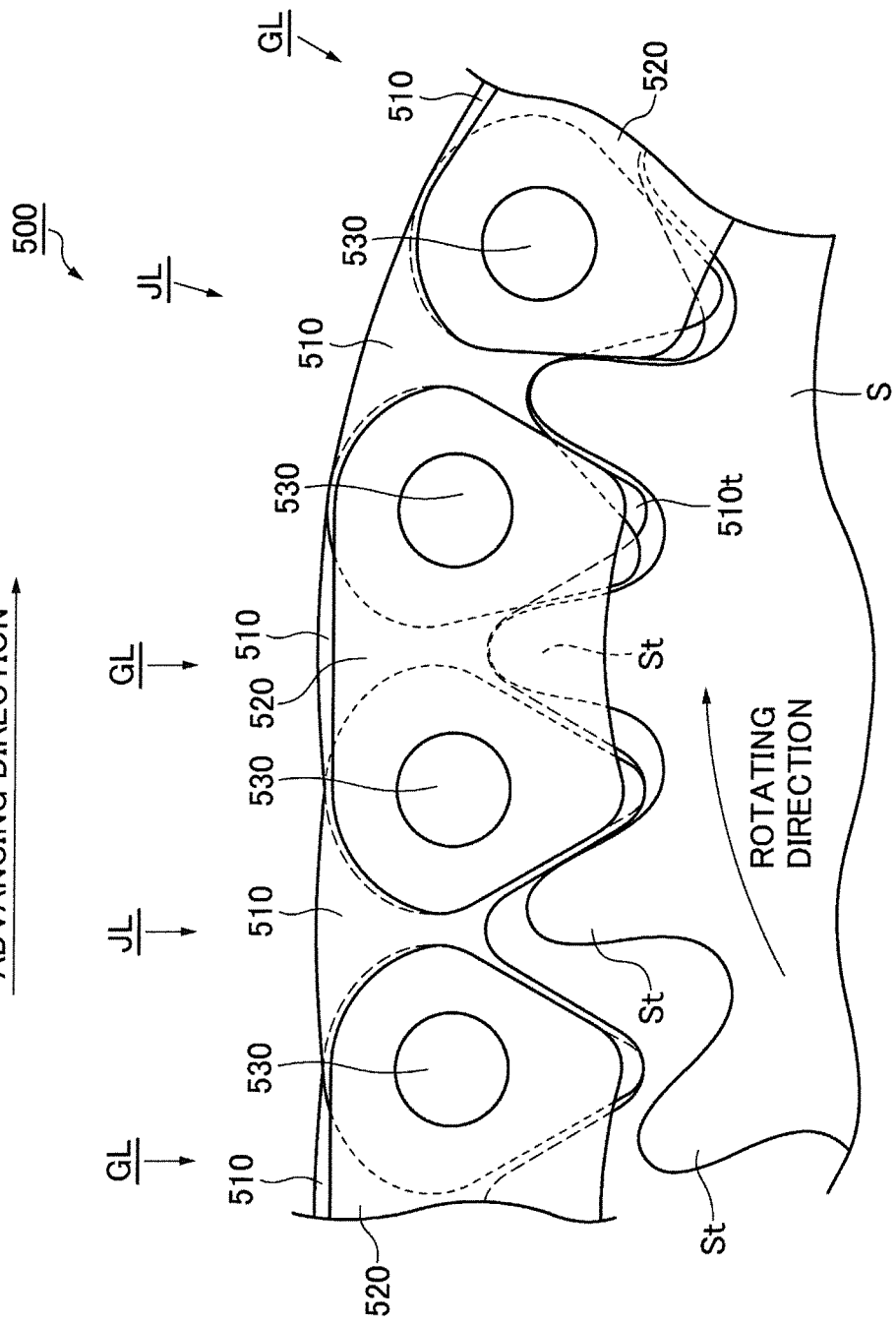
FIG. 14 is a side elevational view showing a portion of the conventional chain of FIG. 13 in engagement with a sprocket.
Figure 15:
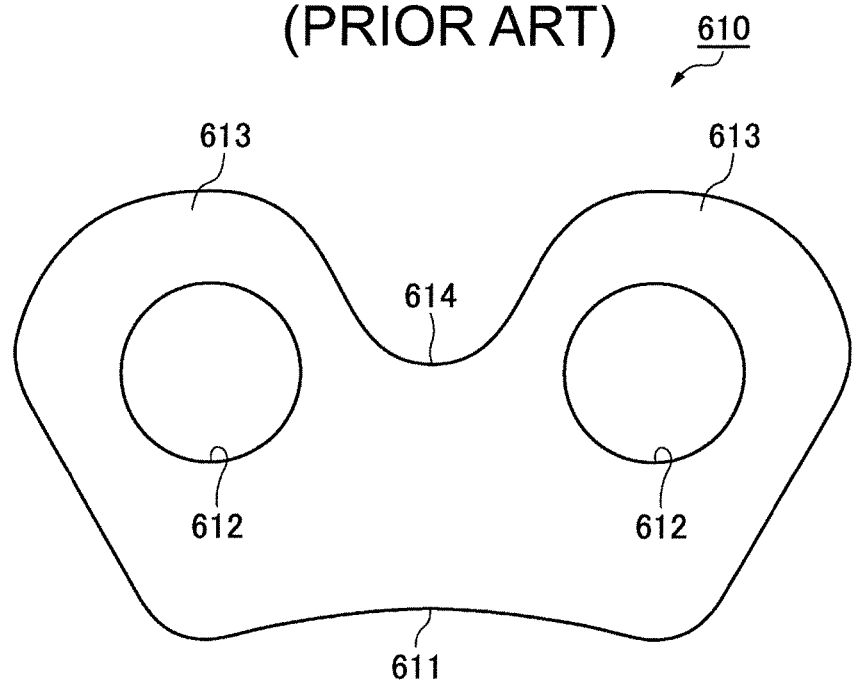
FIG. 15 is a side elevational view of a second conventional guide plate.
Figure 16:
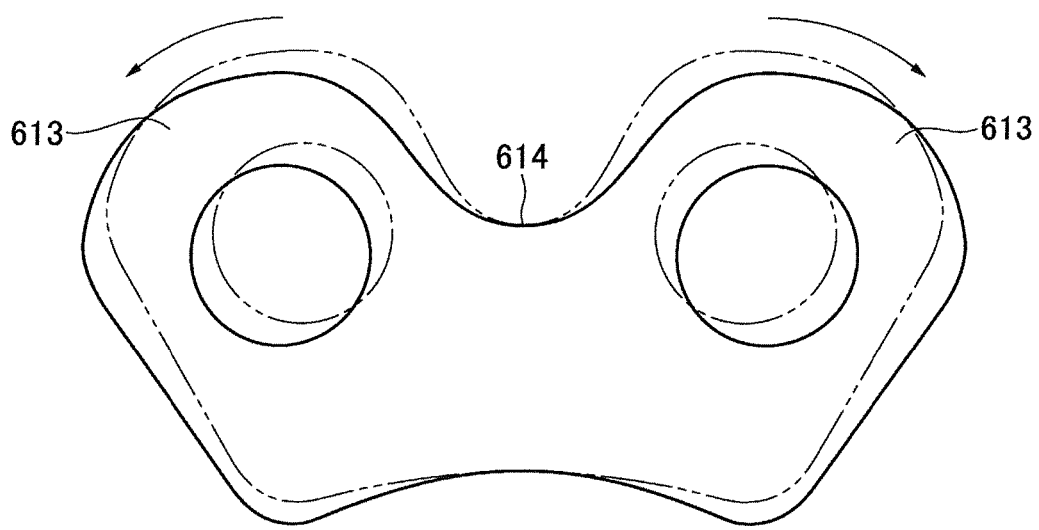
FIG. 16 is a side elevational view illustrating deformation the guide plate of FIG. 15.

In a third embodiment, shown in FIGS. 10 and 11, the cut-away portion 323 of the back surface on the outer side of guide plate 320 includes a flat surface. In this embodiment, the strength of the part of the plate 320 between the cut-away portion 323 and the hole 321 farthest from the flat surface is increased. This configuration suppresses the generation of cracks in the vicinity of a deepest point 323a of the cut-away portion 323 on the outer side of the plate.

Various modifications can be made to the embodiments described above.

For example, whereas the connecting pins 130 shown in FIG. 1 are round pins, the connecting pins of the chain in accordance with the invention can be rocker joint pins each consisting of a rocker pin and a joint pin. When a round pin is used, it tends to contact the inner surface of the pin hole of the link plate in a parallel fashion over a larger area without applying a biased load, so that wear is reduced and wear elongation of the chain is suppressed.

The silent chain of the invention can be either an inner flank engagement/outer flank seating chain or an outer flank engagement/outer flank seating chain, both types being well known in the art of silent chains.

The teeth of the link plate used in the silent chain of the invention may have any of various tooth forms, such as a straight tooth forms or a curved tooth forms. The tooth form will be the same as the tooth form, in a hob axis direction, of a hob cutter used for forming the teeth of the sprockets with which the chain is used. For example, the hob cutter may have a configuration for cutting sprocket teeth having an involute tooth form, or a special curved tooth form.

While the cut-away portions on the inner sides and the cut-away portions on the outer sides of the guide plates of the silent chain of the invention may have a shape composed of curved lines and straight lines, the shapes of the cut-away portions preferably consist of a plurality of curved lines because, with this configuration, stress on the cut-away portions can be more evenly dispersed.

The outer side cut-away portion may be formed at any location on the back surface of the guide plate as long as the deepest parts of the cut-away portion on the outer side is between the pair of the pin holes and is longitudinally offset from the deepest part of the cut-away portion on the inner side.

What is claimed is:

1. A silent chain comprising:
a plurality of link plates having pairs of pin holes, said link plates being arranged in alternating guide rows and non-guide rows along a longitudinal direction, with the link plates of each row interleaved with link plates of a preceding row and a following row to provide a chain in the form of an endless loop, said link plates including guide plates arranged at opposite ends of each guide row; and
connecting pins extending through the pin holes in the link plates, the connecting pins being press-fit into pin holes of the guide plates and fitting loosely in the pin holes of the other plates of the chain to allow articulation of the guide rows relative to the non-guide rows as the chain engages and disengages a sprocket;
wherein each of the guide plates has an inner side facing toward the inside of the loop formed by the chain, and an outer side facing toward the outside of the loop;
wherein each of the said guide plates has a cut-away portion formed on its said inner side and a cut-away portion formed on its said outer side, said cut-away portions allowing elastic deformation of the guide plates in the longitudinal direction;
wherein each of said cut-away portions in each said guide plate has a deepest part, said deepest part of each cut-away portion being the part of the cut-away portion closest to an imaginary pitch line connecting the centers of the pair of pin holes in the guide plate, and wherein said deepest parts of the cut-away portions of each guide plate are disposed on opposite sides of said pitch line;
wherein the deepest parts of the cut-away portions in each of said guide plates are longitudinally offset from each other, whereby one of said deepest parts precedes the other of said deepest parts in said longitudinal direction; and
wherein said inner side has outer flanks, and wherein the shortest distance A from the cut-away portion on the outer side of each said guide plate to the nearest of the pin holes thereof, the shortest distance B from a pin hole thereof to the part of said back surface farthest from said pitch line, the shortest distance C from an outer flank on said inner side to the nearest of the pin holes thereof, and the shortest distance D from one of said cut-away portions to the other satisfy the relationships $A \geq B$, $A \geq C$, $D \geq B$, and $D \geq C$.

2. A silent chain comprising:
a plurality of link plates having pairs of pin holes, said link plates being arranged in alternating guide rows and non-guide rows along a longitudinal direction, with the link plates of each row interleaved with link plates of a preceding row and a following row to provide a chain in the form of an endless loop, said link plates including guide plates arranged at opposite ends of each guide row; and connecting pins extending through the pin holes in the link plates, the connecting pins being press-fit into pin holes of the guide plates and fitting loosely in the pin holes of the other plates of the chain to allow articulation of the guide rows relative to the non-guide rows as the chain engages and disengages a sprocket;

wherein each of the guide plates has an inner side facing toward the inside of the loop formed by the chain, and an outer side facing toward the outside of the loop;

wherein each of the said guide plates has a cut-away portion formed on its said inner side and a cut-away portion formed on its said outer side, said cut-away portions allowing elastic deformation of the guide plates in the longitudinal direction;

wherein each of said cut-away portions in each said guide plate has a deepest part, said deepest part of each cut-away portion being the part of the cut-away portion closest to an imaginary pitch line connecting the centers of the pair of pin holes in the guide plate, and wherein said deepest parts of the cut-away portions of each guide plate are disposed on opposite sides of said pitch line;

wherein the deepest parts of the cut-away portions in each of said guide plates are longitudinally offset from each other, whereby one of said deepest parts precedes the other of said deepest parts in said longitudinal direction; and wherein said inner side has outer flanks, and wherein the shortest distance B from a pin hole thereof to the part of said back surface farthest from said pitch line, the shortest distance C from an outer flank on said inner side to the nearest of the pin holes thereof, the shortest distance D from one of said cut-away portions to the other, and the shortest distance E from said cut-away portion on the inner side to the nearest one of said pin holes satisfy the relationships $D \geq B$, $D \geq C$, $E \geq B$, and $E \geq C$.

* * * * *